US012523064B2

(12) United States Patent
Vestøl

(10) Patent No.: US 12,523,064 B2
(45) Date of Patent: Jan. 13, 2026

(54) LOCK ARRANGEMENT AND LOCK DEVICE

(71) Applicant: ASSA ABLOY Global Solutions AB, Stockholm (SE)

(72) Inventor: Harald Vestøl, Kolbotn (NO)

(73) Assignee: ASSA ABLOY Global Solutions AB, Stockholm (SE)

( * ) Notice: Subject to any disclaimer, the term of this patent is extended or adjusted under 35 U.S.C. 154(b) by 212 days.

(21) Appl. No.: 18/483,676

(22) Filed: Oct. 10, 2023

(65) Prior Publication Data

US 2025/0116135 A1 Apr. 10, 2025

(51) Int. Cl.
*E05B 47/00* (2006.01)
*E05B 47/06* (2006.01)

(52) U.S. Cl.
CPC ...... *E05B 47/0012* (2013.01); *E05B 47/0669* (2013.01); *E05B 2047/0017* (2013.01)

(58) Field of Classification Search
CPC ...... E05B 13/002; E05B 13/004; E05B 47/06; E05B 47/0607; E05B 47/0657; E05B 47/0665; E05B 47/0669; E05B 47/0688; E05B 2047/0017; E05B 2047/0023; E05B 63/08
See application file for complete search history.

(56) References Cited

U.S. PATENT DOCUMENTS 5,953,942 A * 9/1999 Doucet ............... E05B 47/0688 70/277
6,145,353 A * 11/2000 Doucet ............... E05B 47/0692 70/277
6,851,291 B2 * 2/2005 Nunez ................. E05B 47/0673 70/150
9,284,750 B2 * 3/2016 Maeng ................ E05B 47/0012
9,500,007 B2 * 11/2016 Lambrou ................ E05B 47/06
2014/0175810 A1 * 6/2014 Lambrou ............ E05B 47/0661 292/144

FOREIGN PATENT DOCUMENTS

DE 9318001 U1 * 5/1995 ......... E05B 47/0669
DE 4443302 A1 * 6/1996 ......... E05B 47/0669
KR 100807590 B1 * 2/2008 ............... E05B 9/08

* cited by examiner

*Primary Examiner* — Alyson M Merlino
(74) *Attorney, Agent, or Firm* — Schwegman Lundberg & Woessner, P.A.

(57) ABSTRACT

A lock arrangement comprising an operating element including an engageable feature and rotatable around a rotation axis; a blocking element arranged to adopt a blocked position and an unblocked position; a stop; a control element rotatable around a control axis between a locked position where the control element contacts the stop, and an unlocked position; an intermediate element rotatably connected to the control element and the blocking element, respectively, at a first pivot and a second pivot, respectively, the intermediate element being arranged to transmit a movement of the control element to the unlocked position to a movement of the blocking element to the unblocked position; the lock arrangement being configured such that when the control element adopts the locked position, and the unlocked position, respectively, the first pivot is positioned on a first side and a second side, respectively, of a plane comprising the control axis and second pivot.

19 Claims, 7 Drawing Sheets

LOCK ARRANGEMENT AND LOCK DEVICE

TECHNICAL FIELD

The present disclosure generally relates to lock devices. In particular, a lock arrangement and a lock device comprising a lock arrangement, are provided.

BACKGROUND

A lock device in a door leaf may comprise a manually operated handle and a bolt movable by the handle between an extended position and a retracted position. In the extended position, the bolt may engage a strike in a frame such that the door leaf cannot be opened. In the retracted position, the bolt does not engage the strike and the door leaf can be opened.

Such lock device may comprise a lock arrangement including a blocking element movable between a blocked position and an unblocked position, and an operating element fixed to an outer handle. In the blocked position, the blocking element blocks the operating element, and thereby also movements of the handle, such that the handle cannot be rotated. In the unblocked position, the handle can be rotated to retract the bolt.

SUMMARY

One object of the invention is to provide an improved lock arrangement.

A further object of the invention is to provide an improved lock device comprising a lock arrangement.

These objects are achieved by the lock arrangement according to the appended claims.

According to a first aspect, there is provided a lock arrangement comprising an operating element including an engageable feature and arranged to be manually operated to rotate around a rotation axis between a closed position and an open position; a blocking element arranged to adopt a blocked position where the blocking element engages the engageable feature and thereby prevents the operating element from being rotated from the closed position to the open position, and an unblocked position where the blocking element does not engage the engageable feature and thereby allows the operating element from being rotated from the closed position to the open position; a stop; a control element rotatable around a control axis between a locked position, where the control element contacts the stop, and an unlocked position; and an intermediate element rotatably connected to the control element at a first pivot parallel with the control axis and rotatably connected to the blocking element at a second pivot parallel with the control axis, the intermediate element being arranged to transmit a movement of the control element from the locked position to the unlocked position to a movement of the blocking element from the blocked position to the unblocked position; wherein the lock arrangement is configured such that when the control element adopts the locked position, the first pivot is positioned on a first side of a plane comprising the control axis and the second pivot, and when the control element adopts the unlocked position, the first pivot is positioned on a second side of the plane, opposite to the first side.

According to a second aspect, there is provided a lock device comprising a lock arrangement according to the first aspect.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
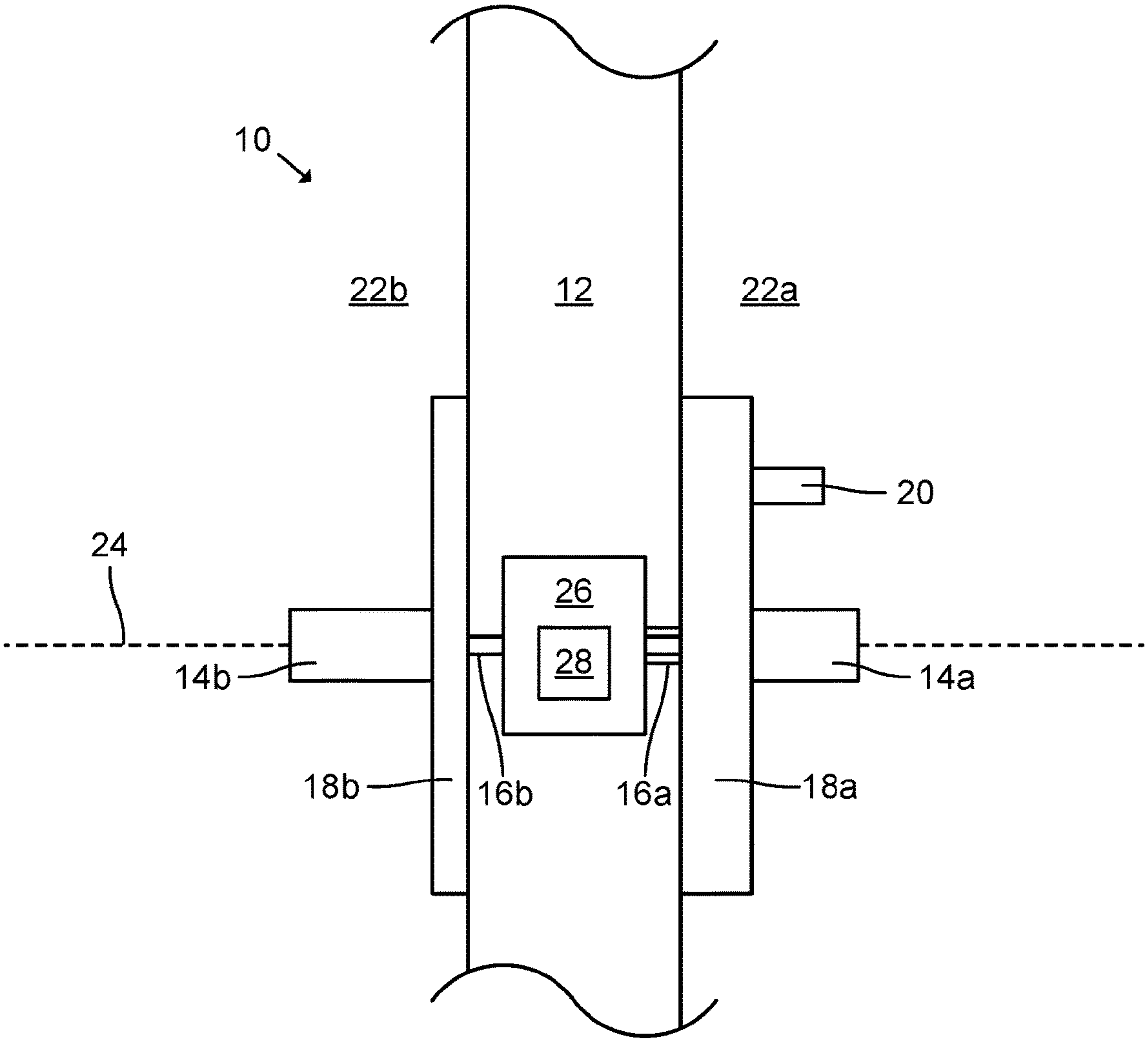
FIG. 1: schematically represents an end view of a lock device installed in an access member.

In the following, a lock arrangement and a lock device comprising a lock arrangement, are described. The same or similar reference numerals will be used to denote the same or similar structural features.

Some lock devices may be impermissibly manipulated to open. For example, by subjecting an operating element to various forces, torques, and/or vibrations, a blocking element in contact with the operating element can be caused to move from a blocked position to an unblocked position. The forces, torques, and/or vibrations may, for example, be exerted on a handle fixed to the operating element. Such manipulation of a lock device is herein referred to as bumping.

By providing a lock arrangement where a blocking element is controlled by a control element via an intermediate element, and configuring the lock arrangement such that when the control element adopts a locked position, the control element contacts a stop and a first pivot is positioned on a first side of a plane comprising a control axis and a second pivot, and when the control element adopts an unlocked position, the first pivot is positioned on a second side of the plane, opposite to the first side, the lock arrangement provides a very strong resistance against bumping. As a consequence, security of a lock device comprising the lock arrangement is increased.

FIG. 1 schematically represents an end view of a lock device 10. The lock device 10 is here installed in a door leaf 12. The door leaf 12 is one example of an access member in which the lock device 10 can be installed. A further example of an access member is a window sash. However, the lock device 10 is not limited to being installed in a door leaf or window sash and can be installed in any suitable access member.

The lock device 10 of this specific and non-limiting example comprises an inner handle **14*a*, an inner spindle 16*a* fixed to the inner handle 14*a*, an inner escutcheon 18*a*, and an optional thumb turn 20 arranged at an inside 22*a* of the door leaf 12. The lock device 10 of this example further comprises an outer handle 14*b*, an outer spindle 16*b* fixed to the outer handle 14*b*, and an outer escutcheon 18*b* arranged at an outside 22*b* of the door leaf 12. The spindles 16*a* and 16*b* are rotatable around a rotation axis 24. As one alternative, the outer handle 14*b* may be rotatable around the rotation axis 24 and the inner handle 14***a* may be rotatable around another axis parallel with, and offset from, the rotation axis 24.

The lock device 10 further comprises a latch 26. The latch 26 is received in a pocket in the door leaf 12. The latch 26 comprises a bolt 28 for engaging a strike in a frame, such as a door or window frame. The bolt 28 may for example be a latch bolt. The latch 26 may be tubular or may comprise a tubular portion in which the bolt 28 moves between a retracted position and an extended position.

The inner spindle 16*a* may be arranged to engage a follower of the latch 26. The outer spindle 16*b* passes through the follower, inside of the inner spindle 16*a*, and into the inner escutcheon 18*a*.

Figure 2:
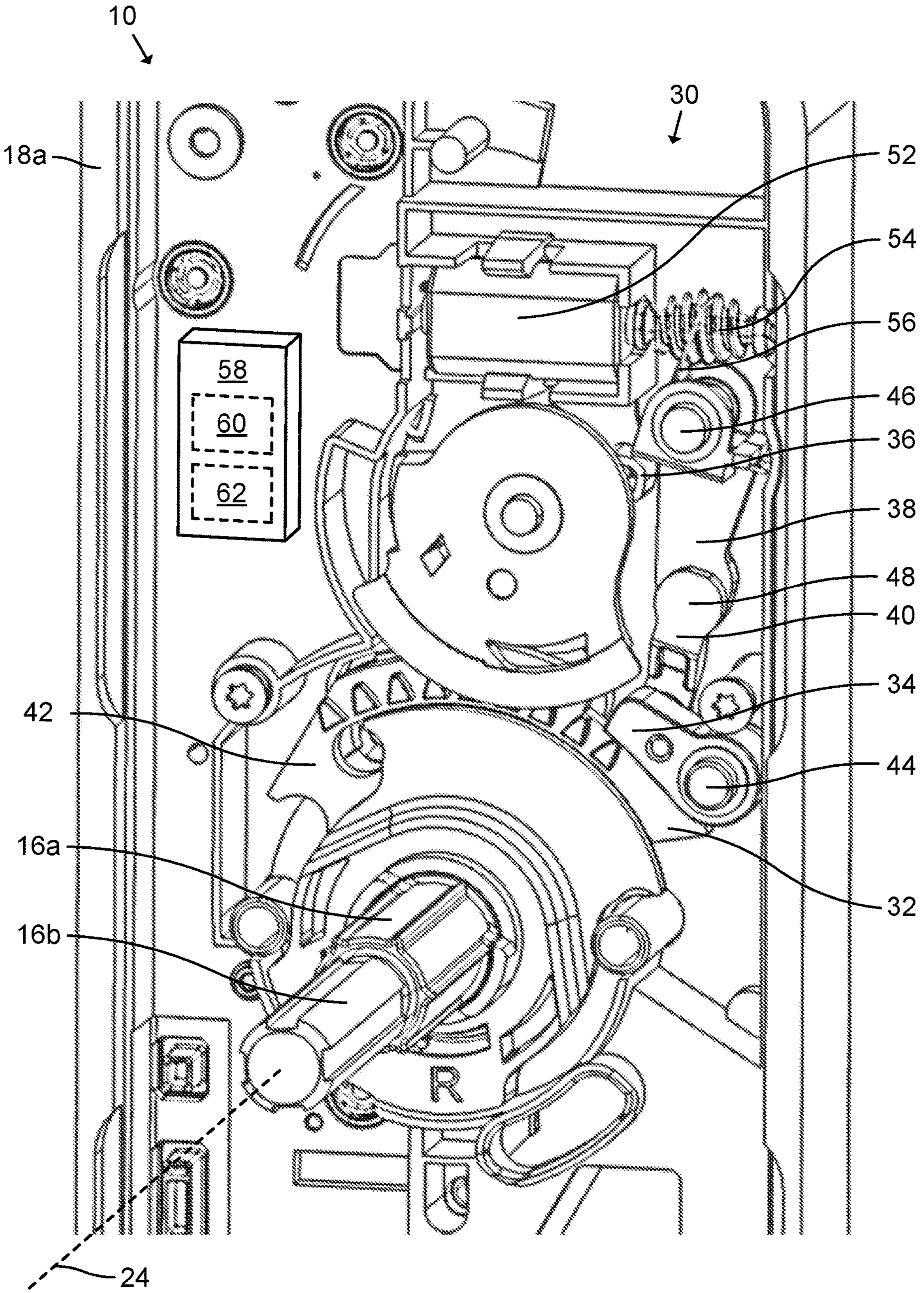
FIG. 2: schematically represents a partial perspective front view of the lock device.

FIG. 2 schematically represents a partial perspective front view of the lock device 10. The lock device 10 comprises a lock arrangement 30. Except for at least a portion of the outer spindle 16*b* and maybe a portion of the inner spindle 16*a*, the lock arrangement 30 of this example may be positioned substantially or entirely inside of the inner escutcheon 18*a*. The lock arrangement 30 comprises an operating element 32, a blocking element 34, a stop 36, a control element 38, and an intermediate element 40.

The operating element 32 is rotatable around the rotation axis 24. The operating element 32 of this example may comprise a disc 42 and the outer spindle 16*b* fixed to the disc 42. Consequently, also the outer handle 14*b* is fixed to the disc 42. The disc 42 is oriented transverse to the rotation axis 24. The operating element 32 can thus be rotated around the rotation axis 24 by manually grabbing and rotating the outer handle 14*b*. The disc 42 of this example may be sector-shaped with respect to the rotation axis 24. When the outer spindle 16*b* is rotated around the rotation axis 24, the outer spindle 16*b* may push the inner spindle 16*a* to rotate in common with the outer spindle 16*b*.

The blocking element 34 of this example is rotatable around a blocking axis 44. The blocking axis 44 is generally parallel with the rotation axis 24. The locking element 34 is here exemplified as, but is not limited to, an arm.

The stop 36 is fixed with respect to the door leaf 12 when the lock device 10 is installed therein. The stop 36 is here exemplified as, but is not limited to, a protrusion on the inner escutcheon 18*a*.

The control element 38 is rotatable around a control axis 46. The control axis 46 is generally parallel with the rotation axis 24.

Figure 5:
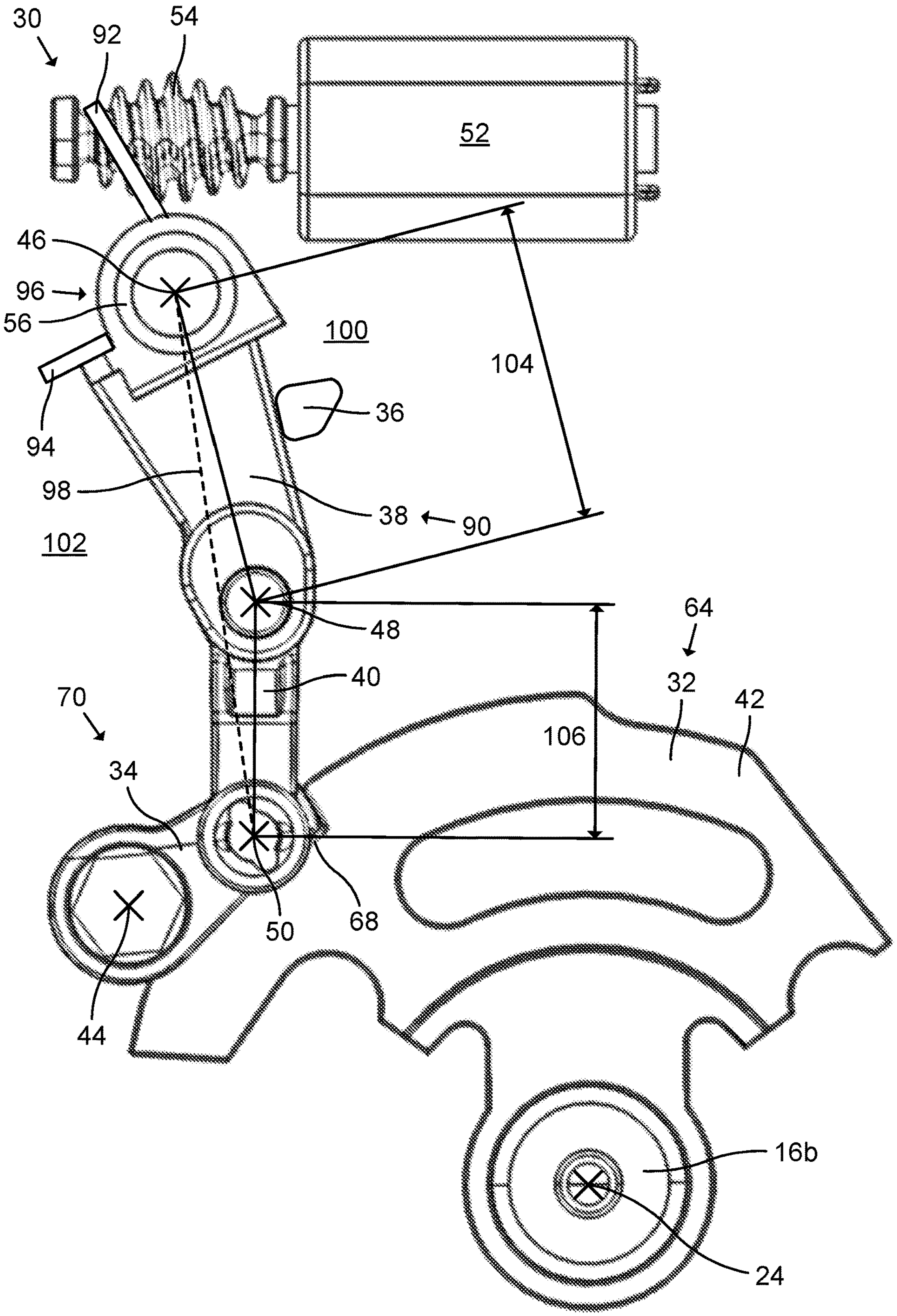
FIG. 5: schematically represents a rear view of the arrangement in FIG. 4.

The intermediate element 40 is rotatably connected to the control element 38 at a first pivot 48. The intermediate element 40 is also rotatably connected to the blocking element 34 at a second pivot 50 (FIG. 5). Each of the first pivot 48 and the second pivot 50 is generally parallel with the rotation axis 24.

In an example, each of the control element 38 and the intermediate element 40 may be elongated. The control element 38, the first pivot 48, and the intermediate element 40 thereby form a knee joint.

The lock arrangement 30 of this example may further comprise an actuator 52. The actuator 52 is here exemplified as, but is not limited to, an electric motor comprising a screw 54.

The lock arrangement 30 of this example further comprises a spring 56. The spring 56 is here embodied as a torsion spring comprising a coil concentric with the control axis 46. The spring 56 is one example of a resilient device. The spring 56 engages the screw 54. The actuator 52 is arranged to control movements of the control element 38 via the spring 56.

The lock arrangement 30 of this example further comprises a control system 58. The control system 58 of this example comprises a data processing device 60 and a memory 62. The memory 62 has a computer program stored therein. The computer program comprises program code which, when executed by the data processing device 60, causes the data processing device 60 to perform, or command performance of, various steps as described herein. The computer program, for example, comprises program code which, when executed by the data processing device 60, causes the data processing device 60 to command the actuator 52 to rotate the screw 54.

Figure 3:
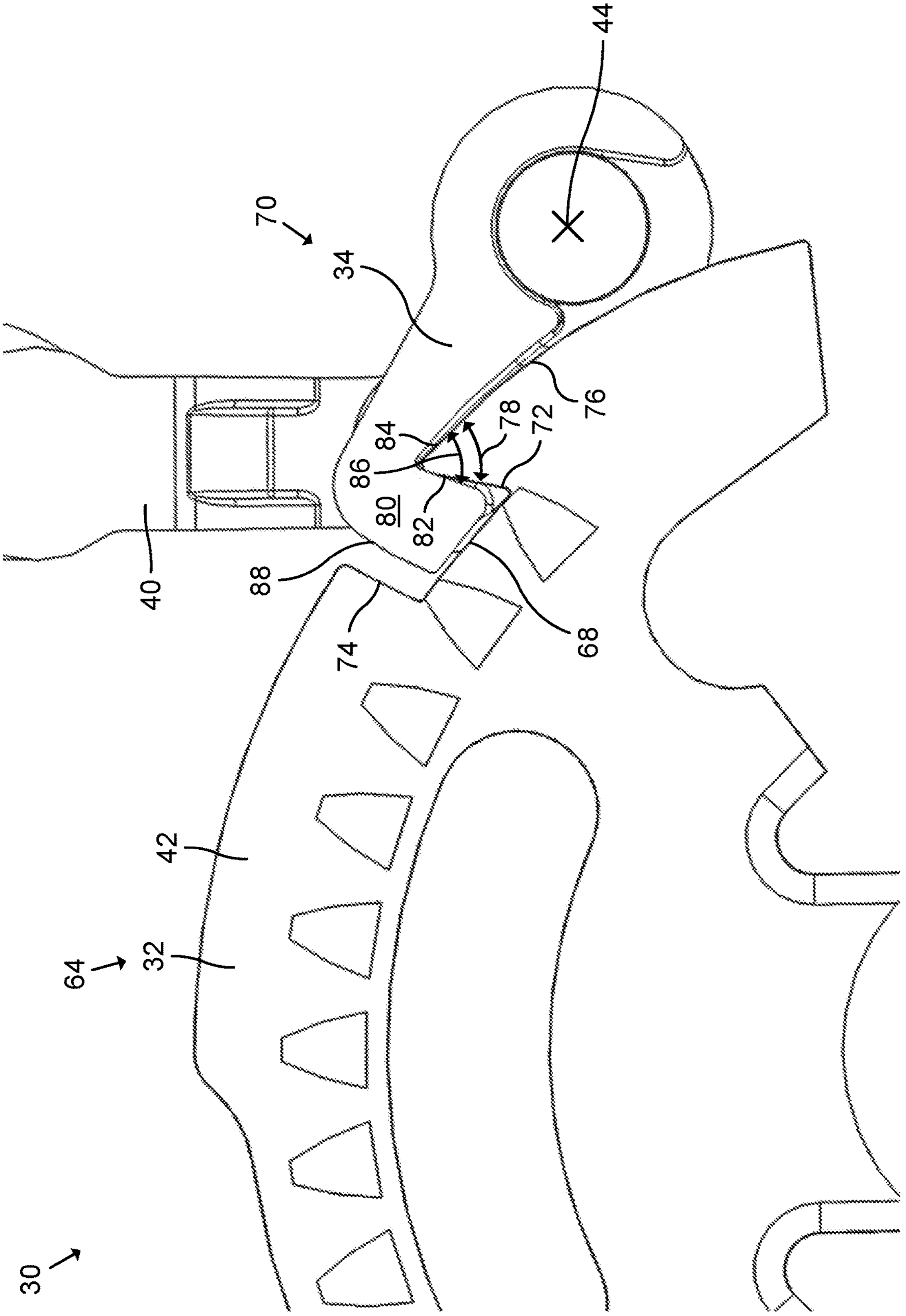
FIG. 3: schematically represents a partial front view of a lock arrangement of the lock device.
Figure 6:
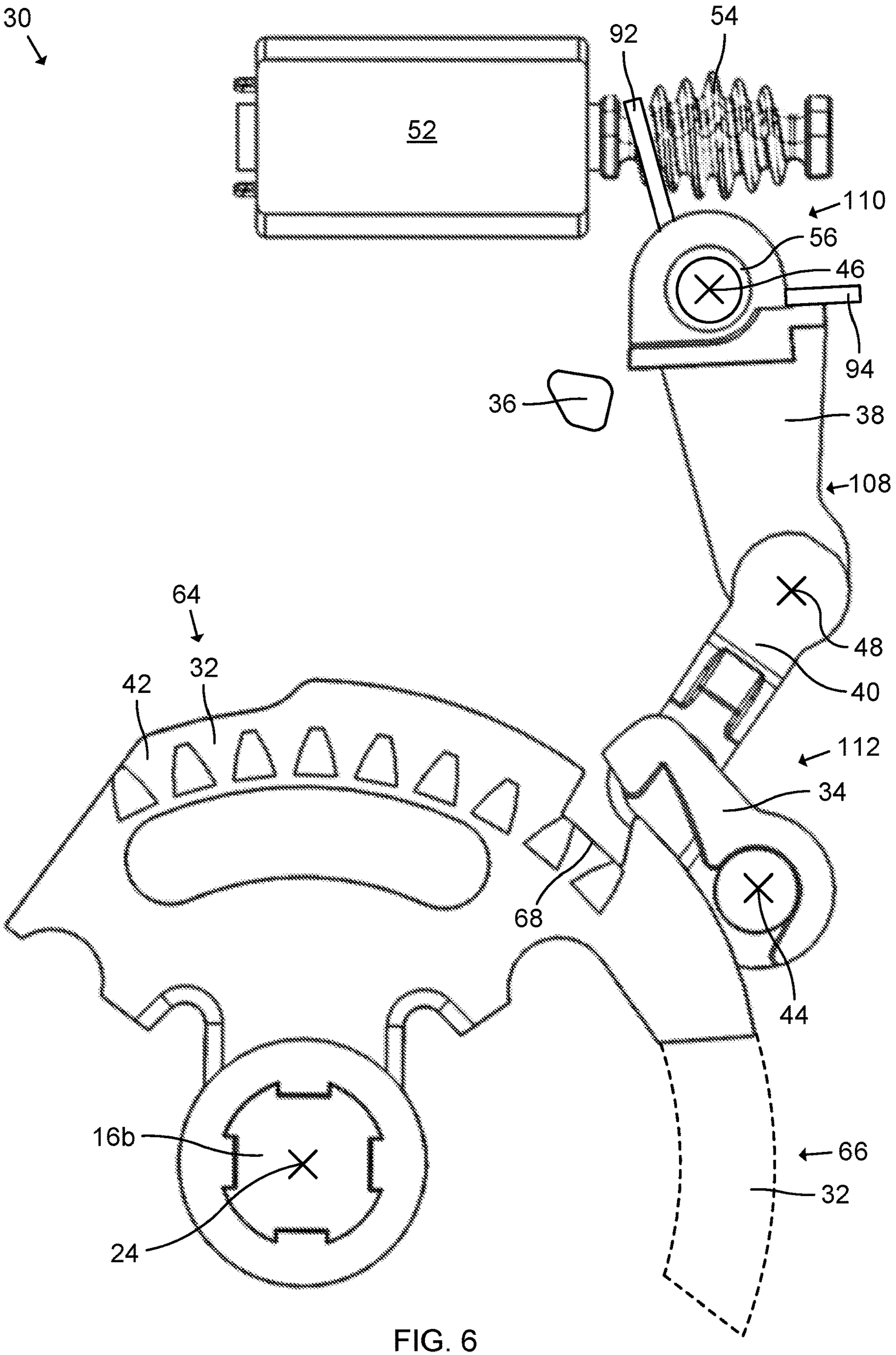
FIG. 6: schematically represents a front view of the arrangement when the blocking element is in an unblocked position.

FIG. 3 schematically represents a partial front view of the lock arrangement 30. In FIG. 3, the operating element 32 is in a closed position 64. The operating element 32 is rotatable around the rotation axis 24 between the closed position 64 and an open position 66 (FIG. 6). The operating element 32 may, for example, rotate at least 30 degrees around the rotation axis 24 from the closed position 64 to the open position 66. Such rotation of the operating element 32 may cause retraction of the bolt 28 via the inner spindle 16*a* and the follower of the latch 26.

The operating element 32 comprises an engageable member or a recess 68, here provided on the disc 42. The recess 68 of this example opens radially outwards with respect to the rotation axis 24. The recess 68 is one non-limiting example of an engageable feature.

In FIG. 3, the blocking element 34 is in a blocked position 70. In the blocked position 70, the blocking element 34 engages the recess 68 and thereby prevents rotation of the operating element 32, for example, of more than five degrees, in each direction around the rotation axis 24. The blocking element 34 in the blocked position 70 thus prevents the operating element 32 from moving from the closed position 64 to the open position 66.

In this example, the disc 42 comprises two opposing side surfaces 72 and 74 partly defining the recess 68. The side surface 72 may be generally planar. The disc 42 of this example further comprises an outer surface 76. The outer surface 76 faces radially outwards with respect to the rotation axis 24. The outer surface 76 of this example is curved and concentric with the rotation axis 24. At a junction between the side surface 72 and the outer surface 76, the side surface 72 and the outer surface 76 form an acute operating element angle 78.

The blocking element 34 of this example comprises a hook 80 arranged to engage the recess 68. The hook 80 of this example may comprise a first hook surface 82 and a second hook surface 84. The first hook surface 82 of this example may be generally planar. The second hook surface 84 of this example may be curved and substantially mate with the outer surface 76 when the blocking element 34 adopts the blocked position 70. At a junction between the first hook surface 82 and the second hook surface 84, the first hook surface 82 and the second hook surface 84 may form an acute hook angle 86. FIG. 3 further shows a distal end 88 of the blocking element 34. The distal end 88 may be curved and may be concentric with the blocking axis 44.

If the operating element 32 is rotated clockwise from the closed position 64 shown in FIG. 3 when the blocking element 34 adopts the blocked position 70, the operating element 32 can only rotate slightly, for example, about three degrees, around the rotation axis 24, before the side surface 74 contacts the distal end 88. A force from the side surface 74 will here act on the distal end 88 in a tangential direction with respect to the rotation axis 24 such that either a torque in a counterclockwise direction (in FIG. 3) with respect to the blocking axis 44 is generated on the blocking element 34, or such that no substantial torque is generated on the blocking element 34 around the blocking axis 44.

If the operating element 32 is attempted to be rotated counterclockwise from the closed position 64 shown in FIG. 3 when the blocking element 34 adopts the blocked position 70, the operating element 32 will engage the hook 80 and the operating element angle 78 and the hook angle 86 will cause the blocking element 34 to be held stably in the blocked position 70 shown in FIG. 3. As shown in FIG. 3, there is a small radial play between the hook 80 and the operating element 32 in this position of the blocking element 34.

Figure 4:
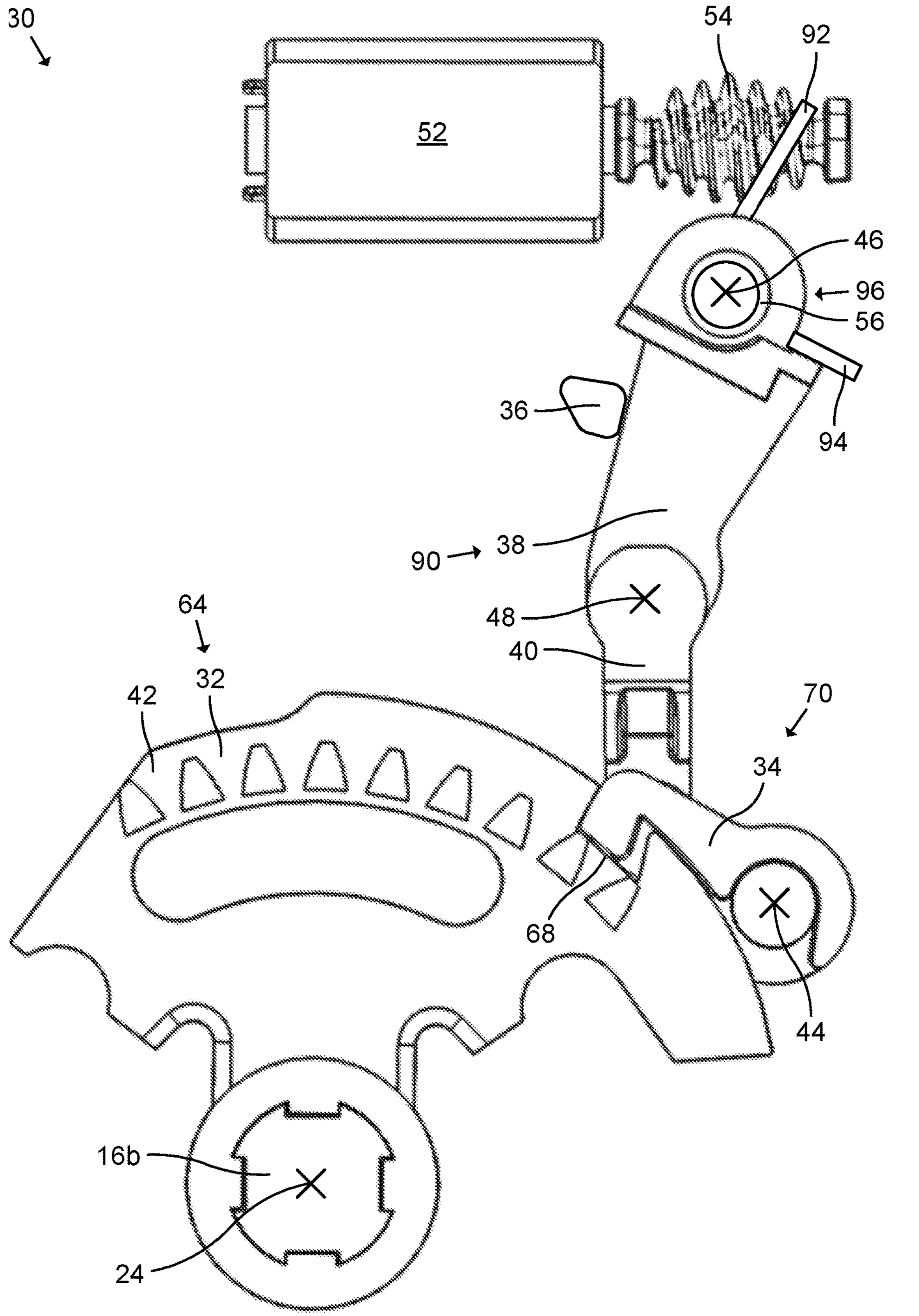
FIG. 4: schematically represents a front view of the arrangement when a blocking element is in a blocked position.

FIG. 4 schematically represents a front view of the lock arrangement 30, and FIG. 5 schematically represents a rear view of the lock arrangement 30 in FIG. 4. With collective reference to FIGS. 4 and 5, the blocking element 34 is in the blocked position 70 and the control element 38 is in a locked position 90. In the locked position 90, the control element 38 contacts the stop 36. In this example, the second pivot 50 is positioned between the blocking axis 44 and the recess 68 when the blocking element 34 adopts the blocked position 70 and the operating element 32 adopts the closed position 64.

The spring 56 of this example may comprise a driving leg 92 and a fixed leg 94. The driving leg 92 engages the screw 54, and the fixed leg 94 is fixed to the control element 38. In FIGS. 4 and 5, the spring 56 is in a locked forcing state 96. In the locked forcing state 96, the spring 56 forces the control element 38 towards the locked position 90. In the locked position 90, the control element 38 is forced by the spring 56 against the stop 36.

FIG. 5 shows a plane 98 comprising the control axis 46 and the second pivot 50. Since the control axis 46 and the second pivot 50 are generally parallel, the control axis 46 and the second pivot 50 define the plane 98 in each position of the blocking element 34. FIG. 5 further shows a first side 100 of the plane 98 and a second side 102 of the plane 98, opposite to the first side 100. When the control element 38 adopts the locked position 90, the first pivot 48 is positioned on the first side 100 of the plane 98. In this example, the stop 36 is positioned on the first side 100 of the plane 98 and in a space generally between the control axis 46 and the first pivot 48. The first pivot 48 is also positioned between the control axis 46 and the blocking element 34, and between the control axis 46 and the second pivot 50, when the control element 38 adopts the locked position 90 and the blocking element 34 adopts the blocked position 70. Moreover, the intermediate element 40 is positioned between the control axis 46 and the blocking axis 44.

FIG. 5 further shows a first distance 104 of the control element 38 and a second distance 106 of the intermediate element 40. The first distance 104 is here defined as a distance between the control axis 46 and the first pivot 48. The second distance 106 is here defined as a distance between the first pivot 48 and the second pivot 50. In this specific example, the first distance 104 may be larger than the second distance 106. Thus, the elongated control element 38 may be longer than the elongated intermediate element 40.

Due to the first pivot 48 being positioned on the first side 100 of the plane 98 and the control element 38 contacting the stop 36, the blocking element 34 is geometrically locked in the blocked position 70. For example, in case vibrations tending to move the blocking element 34 out from the recess 68 act on the blocking element 34, such movement of the blocking element 34 will be transmitted by the second pivot 50 to a force on the intermediate element 40 towards the first pivot 48, and such force in the intermediate element 40 will be transmitted to a torque in the control element 38 around the control axis 46 against the stop 36. The lock arrangement 30 thereby provides a very strong resistance against bumping.

The control element 38, the intermediate element 40, and the blocking element 34 may each have a relatively low mass. For example, each of the control element 38, the intermediate element 40, and the blocking element 34 may be made of plastic. This makes bumping of the lock arrangement 30 even more difficult.

Figure 7:
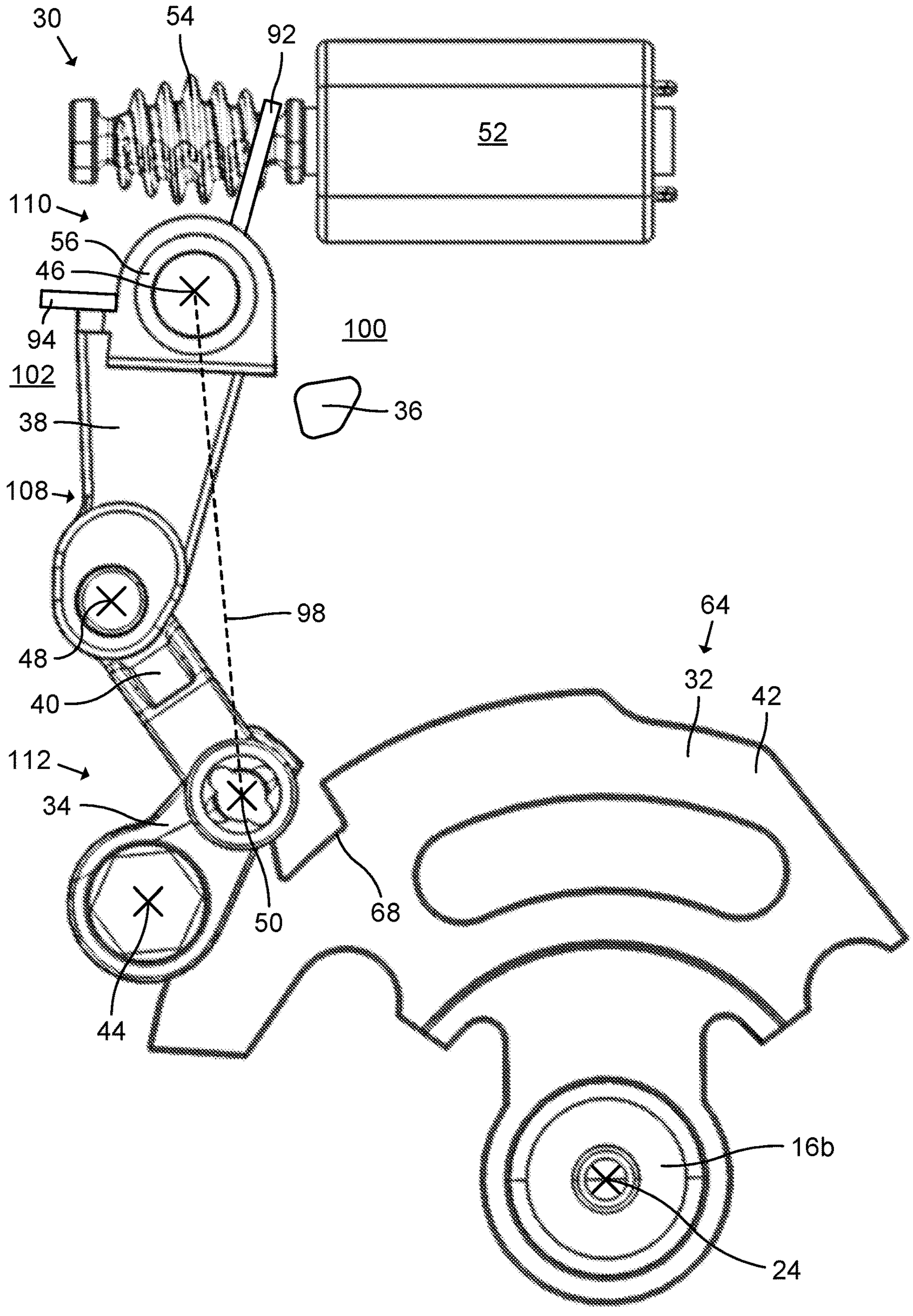
FIG. 7: schematically represents a rear view of the arrangement in FIG. 6.

FIG. 6 schematically represents a front view of the lock arrangement 30, and FIG. 7 schematically represents a rear view of the lock arrangement 30 in FIG. 6. With collective reference to FIGS. 6 and 7, the control element 38 has rotated around the control axis 46 from the locked position 90 to an unlocked position 108. The control element 38 has, for example, here rotated approximately 30 degrees around the control axis 46 from the locked position 90 to the unlocked position 108. In the unlocked position 108 of this example, the control element 38 does not contact the stop 36.

The control system 58 may, for example, be configured to control the actuator 52 to rotate the screw 54 in response, for example, to a granted authorization request. The rotation of the screw 54 causes the driving leg 92 to travel along threads of the screw 54, for example, from a right end of the screw 54 in FIG. 4 towards a left end of the screw 54 in FIG. 6. The spring 56 is thereby caused to switch from the locked forcing state 96 to an open forcing state 110. In the open forcing state 110, the spring 56 forces the control element 38 towards the unlocked position 108. Should the control element 38 be prevented from moving from the locked position 90 to the unlocked position 108, for example, by applying a torque on the operating element 32 by the outer handle 14*b*, the screw 54 can still be rotated to cause the driving leg 92 to travel over the screw 54 to cause the spring 56 to switch from the locked forcing state 96 to the open forcing state 110. Once the outer handle 14*b* is released, the spring 56 in the open forcing state 110 will cause locked position 90 to move from the locked position 90 to the unlocked position 108 by the mechanical energy stored in the spring 56 even if the actuator 52 is now inactive. In this way, the actuator 52 is arranged to move the control element 38 from the locked position 90 to the unlocked position 108 and the spring 56 provides a mechanical memory improving an energy-efficiency of the actuator 52.

When the control element 38 moves from the locked position 90 to the unlocked position 108, the first pivot 48 moves from the first side 100 of the plane 98 to the second side 102, i.e., the first pivot 48 crosses the plane 98. During movement of the first pivot 48 towards the plane 98 on the first side 100, the intermediate element 40 pushes the blocking element 34 slightly further down into the recess 68 within the small play between the blocking element 34 and the operating element 32. During movement of the first pivot 48 away from the plane 98 on the second side 102, the intermediate element 40 pulls the blocking element 34 out from the recess 68. The blocking element 34 thereby adopts an unblocked position 112. This constitutes one specific example of the intermediate element 40 being arranged to transmit a movement of the control element 38 from the locked position 90 to the unlocked position 108 to a movement of the blocking element 34 from the blocked position 70 to the unblocked position 112. Moreover, as can be seen in FIGS. 6 and 7, the spring 56 acts indirectly on the blocking element 34 via the control element 38 and the intermediate element 40. As the blocking element 34 rotates around the blocking axis 44, also the plane 98 moves slightly. In the unblocked position 112, the blocking element 34 does not engage the recess 68. The operating element 32 can thereby be rotated from the closed position 64 to the open position 66, for example, by turning the outer handle 14*b*.

Notably, when the blocking element 34 is in the blocked position 70, the blocking element 34 cannot be forced by the outer spindle 16*b* to cause the first pivot 48 to cross the plane 98. With reference to FIG. 5, a clockwise rotation of the blocking element 34 will be stopped by the operating element 32 in the recess 68 before the first pivot 48 crosses the plane 98, and a counterclockwise rotation of the blocking element 34 will be stopped by the stop 36 via the control element 38 and the intermediate element 40.

Also, when the control element 38 adopts the unlocked position 108 and the blocking element 34 adopts the unblocked position 112 in FIGS. 6 and 7, the first pivot 48 is here positioned between the control axis 46 and the blocking element 34, and between the control axis 46 and the blocking axis 44. As seen in the view of FIG. 6, the blocking element 34 has rotated in a clockwise direction around the blocking axis 44 from the blocked position 70 to the unblocked position 112, while the control element 38 has rotated in a counterclockwise direction around the control axis 46 from the locked position 90 to the unlocked position 108. In this example, the blocking element 34 has rotated, for example, approximately 20 degrees around the blocking axis 44 from the blocked position 70 to the unblocked position 112.

Also, when the control element 38 adopts the unlocked position 108 and the blocking element 34 adopts the unblocked position 112, the intermediate element 40 is positioned between the control axis 46 and the blocking axis 44, in this example. Moreover, in this example, the intermediate element 40 has rotated, for example, approximately 30 degrees in space around the first pivot 48 during the movement of the control element 38 from the locked position 90 to the unlocked position 108 and during the movement of the blocking element 34 from the blocked position 70 to the unblocked position 112. Moreover, in this example, the intermediate element 40 has rotated, for example, approximately 60 degrees relative to control element 38 around the first pivot 48 during the movement of the control element 38 from the locked position 90 to the unlocked position 108 and during the movement of the blocking element 34 from the blocked position 70 to the unblocked position 112.

Some embodiments include a lock arrangement 30 comprising an operating element 32 including an engageable feature 68 and arranged to be manually operated to rotate around a rotation axis 24 between a closed position 64 and an open position 66; a blocking element 34 arranged to adopt a blocked position 70 where the blocking element 34 engages the engageable feature 68 and thereby prevents the operating element 32 from being rotated from the closed position 64 to the open position 66, and an unblocked position 112 where the blocking element 34 does not engage the engageable feature 68 and thereby allows the operating element 32 from being rotated from the closed position 64 to the open position 66; a stop 36; a control element 38 rotatable around a control axis 46 between a locked position 90 where the control element 38 contacts the stop 36, and an unlocked position 108; and an intermediate element 40 rotatably connected to the control element 38 at a first pivot 48 parallel with the control axis 46, and rotatably connected to the blocking element 34 at a second pivot 50 parallel with the control axis 46, the intermediate element 40 being arranged to transmit a movement of the control element 38 from the locked position 90 to the unlocked position 108 to a movement of the blocking element 34 from the blocked position 70 to the unblocked position 112; wherein the lock arrangement 30 is configured such that when the control element 38 adopts the locked position 90, the first pivot 48 is positioned on a first side 100 of a plane 98 comprising the control axis 46 and the second pivot 50, and when the control element 38 adopts the unlocked position 108, the first pivot 48 is positioned on a second side 102 of the plane 98, opposite to the first side 100.

If the blocking element 34 is subjected to a force tending to move the blocking element 34 from the blocked position 70 towards the unblocked position 112, this force will be transferred via the intermediate element 40 to the control element 38. The control element 38 is thereby forced against the stop 36. Thus, in addition to controlling movements of the blocking element 34 between the blocked position 70 and the unblocked position 112, the control element 38 also, together with the intermediate element 40, function as a locking mechanism for locking the blocking element 34 in the blocked position 70. The lock arrangement 30 thereby provides an improved security, for example, against bumping attacks.

The first pivot 48 may cross the plane 98 when the control element 38 moves between the locked position 90 and the unlocked position 108. The control element 38, the first pivot 48, and the intermediate element 40 may form a knee joint. In these cases, the knee joint may move over center, i.e., the first pivot 48 may move across the plane 98, when the control element 38 moves between the locked position 90 and the unlocked position 108. The first pivot 48 may be positioned between the control axis 46 and the blocking element 34 both when the control element 38 and the blocking element 34 adopt the locked position 90 and the blocked position 70, respectively, and when the control element 38 and the blocking element 34 adopt the unlocked position 108 and the unblocked position 112, respectively. Each of the control element 38, the intermediate element 40, and the blocking element 34 may be made of plastic.

The operating element 32 may comprise a disc 42 oriented transverse to the rotation axis 24. The disc 42 may be sector-shaped.

When the lock arrangement 30 is installed in a lock device 10, a movement of the operating element 32 from the closed position 64 to the open position 66 may cause a bolt 28 to move from an extended position to a retracted position, and vice versa.

When the blocking element 34 adopts the blocked position 70, the blocking element 34 may prevent the operating element 32 from rotating more than, for example, about five degrees around the rotation axis 24. An angular distance between the closed position 64 and the open position 66 of the operating element 32 with respect to the rotation axis 24 may be at least 30 degrees.

The stop 36 may, for example, be a protrusion. Such protrusion may, for example, be provided in a housing of the lock device 10, such as in an inner escutcheon 18*a*. In the unlocked position 108, the control element 38 may not contact the stop 36, e.g., may be separated from the stop 36. The control element 38 may, for example, rotate at least 10 degrees, such as at least 20 degrees, around the control axis 46 between the locked position 90 and the unlocked position 108. The intermediate element 40 may, for example, rotate at least 30 degrees relative to control element 38 around the first pivot 48 during the movement of the control element 38 from the locked position 90 to the unlocked position 108 and during the movement of the blocking element 34 from the blocked position 70 to the unblocked position 112.

In some embodiments, the blocking element 34 is rotatable around a blocking axis 44, parallel with the control axis 46, between the blocked position 70 and the unblocked position 112. The blocking element 34 may, for example, rotate at least 10 degrees around the blocking axis 44 from the blocked position 70 to the unblocked position 112. The control element 38 may rotate in a first direction around the control axis 46 from the locked position 90 to the unlocked position 108. In these cases, the blocking element 34 may rotate in a second direction, opposite to the first direction, around the blocking axis 44 from the blocked position 70 to the unblocked position 112.

The first pivot 48 may be positioned between the control axis 46 and blocking axis 44 both when the control element 38 and the blocking element 34 adopt the locked position 90 and the blocked position 70, respectively, and when the control element 38 and the blocking element 34 adopt the unlocked position 108 and the unblocked position 112, respectively. The intermediate element 40 may be positioned between the control axis 46 and the blocking axis 44 both when the control element 38 and the blocking element 34 adopt the locked position 90 and the blocked position 70, respectively, and when the control element 38 and the blocking element 34 adopt the unlocked position 108 and the unblocked position 112, respectively. In some alternative embodiments, the blocking element 34 is linearly movable between the blocked position 70 and the unblocked position 112.

In some embodiments, the second pivot 50 is positioned between the blocking axis 44 and the engageable feature 68 when the blocking element 34 adopts the blocked position 70 and the operating element 32 adopts the closed position 64.

In some embodiments, the stop 36 is positioned on the first side 100 of the plane 98. In these cases, the stop 36 may be positioned generally between the control axis 46 and the first pivot 48.

In some embodiments, each of the control element 38 and the intermediate element 40 is elongated. This enables a compact design of the lock arrangement 30. In some alternative embodiments, the control element 38 is a disc, such as a circular disc. In such embodiments, the control element 38 may comprise a tab extending radially outwards with respect to the control axis 46 for engaging the stop 36 in the locked position 90.

In some embodiments, a first distance 104 between the control axis 46 and the first pivot 48 is larger than a second distance 106 between the first pivot 48 and the second pivot 50. For example, if each of the control element 38 and the intermediate element 40 is elongated, a length of the control element 38 may be longer than a length of the intermediate element 40.

In some embodiments, the engageable feature 68 comprises a recess. The recess may open radially outwards with respect to the rotation axis 24.

In some embodiments, the operating element 32 comprises a side surface 72 defining the recess and an outer surface 76, wherein the side surface 72 and the outer surface 76 form an acute operating element angle 78. The outer surface 76 may be curved, such as concentric with respect to the rotation axis 24. In any case, the outer surface 76 may face radially outwards with respect to the rotation axis 24. The side surface 72 may be planar. In case the outer surface 76 is curved, the operating element angle 78 may be defined based on the side surface 72 and a tangential line of the outer surface 76 at a junction between the outer surface 76 and the side surface 72.

In some embodiments, the blocking element 34 comprises a hook 80 arranged to engage the recess. In some alternative embodiments, the blocking element 34 comprises a recess and the operating element 32 comprises a hook 80 arranged to engage the recess.

In some embodiments, the hook 80 comprises a first hook surface 82 and a second hook surface 84 forming an acute hook angle 86. The first hook surface 82 may be planar. The second hook surface 84 may be curved to mate with the outer surface 76 when the blocking element 34 adopts the blocked position 70.

In some embodiments, a distal end 88 of the blocking element 34 is convex in a direction away from the second pivot 50. The blocking element 34 may for example be curved concentric with respect to the blocking axis 44.

In some embodiments, the operating element 32 comprises a spindle **16*b*. The spindle 16*b* may be an outer spindle, for example, for an outer handle 14*b***.

In some embodiments, the lock arrangement 30 further comprises an actuator 52 arranged to move the control element 38 between the locked position 90 and the unlocked position 108. In some embodiments, the actuator 52 is an electromechanical actuator. In some embodiments, the actuator 52 comprises a screw 54.

The lock arrangement 30 may further comprise a control system 58 comprising at least one data processing device 60 and at least one memory 62 having at least one computer program stored therein, the at least one computer program comprising program code which, when executed by the at least one data processing device 60, causes the at least one data processing device 60 to perform, or command performance of, various steps as described herein. The computer program may comprise program code which, when executed by the data processing device 60, causes the data processing device 60 to command the actuator 52 to move the control element 38 from the locked position 90 to the unlocked position 108 in response to a granted authorization request. The authorization request may be granted when a user presents a valid credential. The credential may be input by a user in numerous ways known to the skilled person, for example, by means of a keypad or a wireless identification tag.

The computer program may further comprise program code which, when executed by the data processing device 60, causes the data processing device 60 to command the actuator 52 to move the control element 38 from the unlocked position 108 to the locked position 90 in response to a locking signal and/or upon expiry of a certain time limit.

In some embodiments, the lock arrangement 30 further comprises a resilient device 56 movable between a locked forcing state 96 where the resilient device 56 forces the control element 38 towards the locked position 90, and an open forcing state 110 where the resilient device 56 forces the control element 38 towards the unlocked position 108; wherein the actuator 52 is arranged to move the resilient device 56 between the locked forcing state 96 and the open forcing state 110. Thus, instead of the resilient device 56 acting directly on the blocking element 34, the resilient device 56 acts indirectly on the blocking element 34 via the control element 38 and the intermediate element 40.

In some embodiments, the resilient device 56 comprises a spring. In some embodiments, the spring is a torsion spring arranged around the control axis 46. The actuator 52, the resilient device 56, and the control element 38 may be constituted by an actuator, a resilient device, and a blocking member, respectively, of any type as described in Swedish patent application no. 2250735-4, filed on 17 Jun. 2022, the content of which is incorporated herein by reference in its entirety.

Some embodiments include a lock device 10 comprising a lock arrangement 30. In some embodiments, the lock device 10 further comprises a handle 14*b* fixed with respect to the operating element 32. In these cases, the handle 14*b* and the operating element 32 rotate in common around the rotation axis 24. The handle 14*b* may be an outer handle. The handle 14*b* may be fixed to the spindle 16*b*.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A lock arrangement comprising:

an operating element including an engageable feature and arranged to be manually operated to rotate around a rotation axis between a closed position and an open position;

a blocking element arranged to adopt a blocked position, in which the blocking element engages the engageable feature and thereby prevents the operating element from being rotated from the closed position to the open position, and an unblocked position, in which the blocking element does not engage the engageable feature and thereby allows the operating element to be rotated from the closed position to the open position;

a stop;

a control element rotatable around a control axis between a locked position, in which the control element contacts the stop, and an unlocked position; and an intermediate element rotatably connected to the control element at a first pivot parallel with the control axis, and rotatably connected to the blocking element at a second pivot parallel with the control axis, the intermediate element being arranged to transmit a rotation of the control element from the locked position to the unlocked position to a movement of the blocking element from the blocked position to the unblocked position;

wherein the lock arrangement is configured such that when the control element adopts the locked position, the first pivot is positioned on a first side of a plane comprising the control axis and the second pivot, and when the control element adopts the unlocked position, the first pivot is positioned on a second side of the plane, opposite to the first side.

2. The lock arrangement according to claim 1, wherein the blocking element is rotatable around a blocking axis, parallel with the control axis, between the blocked position and the unblocked position.

3. The lock arrangement according to claim 2, wherein the second pivot is positioned between the blocking axis and the engageable feature when the blocking element adopts the blocked position and the operating element adopts the closed position.

4. The lock arrangement according to claim 1, wherein the stop is positioned on the first side of the plane, and positioned in a space between the control axis and the first pivot.

5. The lock arrangement according to claim 1, wherein each of the control element and the intermediate element is elongated.

6. The lock arrangement according to claim 1, wherein a first distance between the control axis and the first pivot is larger than a second distance between the first pivot and the second pivot.

7. The lock arrangement according to claim 1, wherein the engageable feature comprises a recess.

8. The lock arrangement according to claim 7, wherein the operating element comprises a side surface defining the recess and an outer surface, wherein the side surface and the outer surface form an acute operating element angle.

9. The lock arrangement according to claim 7, wherein the blocking element comprises a hook arranged to engage the recess.

10. The lock arrangement according to claim 9, wherein the hook comprises a first hook surface and a second hook surface forming an acute hook angle.

11. The lock arrangement according to claim 1, wherein a distal end of the blocking element is convex in a direction away from the second pivot.

12. The lock arrangement according to claim 1, wherein the operating element comprises a spindle.

13. The lock arrangement according to claim 1, further comprising an actuator arranged to rotate the control element between the locked position and the unlocked position.

14. The lock arrangement according to claim 13, wherein the actuator is an electromechanical actuator.

15. The lock arrangement according to claim 13, further comprising a resilient device movable between a locked forcing state, in which the resilient device forces the control element towards the locked position, and an open forcing state, in which the resilient device forces the control element towards the unlocked position; wherein the actuator is arranged to move the resilient device between the locked forcing state and the open forcing state.

16. The lock arrangement according to claim 15, wherein the resilient device comprises a spring.

17. The lock arrangement according to claim 16, wherein the spring is a torsion spring arranged around the control axis.

18. A lock device comprising a lock arrangement according to claim 1.

19. The lock device according to claim 18, further comprising a handle fixed with respect to the operating element.

* * * * *